(12) United States Patent
Chakravorty et al.

(10) Patent No.: US 11,113,410 B2
(45) Date of Patent: Sep. 7, 2021

(54) USER CONTROLLED, DECENTRALIZED, DISTRIBUTED, AND SECURE CONTENT DISTRIBUTION

(71) Applicant: UNIVERSITY OF STAVANGER, Stavanger (NO)

(72) Inventors: Antorweep Chakravorty, Stavanger (NO); Chunming Rong, Stavanger (NO)

(73) Assignee: THE UNIVERSITY OF STAVANGER, Stavanger (NO)

( * ) Notice: Subject to any disclaimer, the term of this patent is extended or adjusted under 35 U.S.C. 154(b) by 265 days.

(21) Appl. No.: 16/475,438

(22) PCT Filed: Jan. 3, 2018

(86) PCT No.: PCT/EP2018/050125
§ 371 (c)(1),
(2) Date: Jul. 2, 2019

(87) PCT Pub. No.: WO2018/127511
PCT Pub. Date: Jul. 12, 2018

(65) Prior Publication Data
US 2019/0347433 A1 Nov. 14, 2019

Related U.S. Application Data

(60) Provisional application No. 62/441,763, filed on Jan. 3, 2017.

(51) Int. Cl.
*G06F 21/62* (2013.01)
*H04L 9/30* (2006.01)
*H04L 9/32* (2006.01)

(52) U.S. Cl.
CPC .......... *G06F 21/6209* (2013.01); *H04L 9/30* (2013.01); *H04L 2209/38* (2013.01)

(58) Field of Classification Search
CPC ... G06F 21/6209; H04L 9/30; H04L 2209/38; H04L 9/3239
See application file for complete search history.

(56) References Cited

U.S. PATENT DOCUMENTS 9,397,985 B1 * 7/2016 Seger, II ............. H04L 63/0442
10,114,969 B1 * 10/2018 Chaney ................. H04L 9/3247
(Continued)

OTHER PUBLICATIONS

Kishigami, Jay et al., The Blockchain-based Digital Content Distribution System, IEEE Fifth International Conference on Big Data and Cloud Computing, pp. 187-190 (2015).
(Continued)

*Primary Examiner* — Darren B Schwartz
(74) *Attorney, Agent, or Firm* — Porter Wright Morris & Arthur LLP

(57) ABSTRACT

A technology is presented for controlling the distribution of a data item. A data set is stored at a data storage (16) and comprises a first file identifier and a first encrypted data item generated by an encryption using a first public key. A blockchain comprises the first file identifier paired with a first recipient identifier identifying one or more allowed first recipients, each having the first recipient identifier and a first private key matching the first public key. The method is performed by a second terminal (12) being an allowed first recipient and the method comprises: identifying (102) the first file identifier in the blockchain using the first recipient identifier, sending (106) a request containing the first file identifier to the data storage (16) for downloading of the first encrypted data item, receiving (116) the first encrypted data item from the data storage (16), and decrypting (118) the first encrypted data item using the first private key.

18 Claims, 3 Drawing Sheets

(56) References Cited

U.S. PATENT DOCUMENTS

| | | | |
|---|---|---|---|
| 10,341,309 B1* | 7/2019 | Ramirez | H04L 63/0442 |
| 2004/0078066 A1* | 4/2004 | Ohta | H04N 21/43615 |
| | | | 607/60 |
| 2005/0120232 A1* | 6/2005 | Hori | G06Q 30/06 |
| | | | 713/193 |
| 2010/0235649 A1* | 9/2010 | Jeffries | G06F 21/6209 |
| | | | 713/189 |
| 2016/0014095 A1* | 1/2016 | Strayer | H04L 63/0428 |
| | | | 713/168 |
| 2016/0203572 A1* | 7/2016 | McConaghy | G06Q 20/10 |
| | | | 705/58 |
| 2016/0330027 A1 | 11/2016 | Ebrahimi | |
| 2017/0046526 A1* | 2/2017 | Chan | G06Q 10/063114 |
| 2017/0093830 A1* | 3/2017 | Wuehler | H04L 63/10 |
| 2017/0116693 A1* | 4/2017 | Rae | H04L 9/3236 |
| 2017/0244556 A1* | 8/2017 | Wold | H04L 9/14 |
| 2018/0191502 A1* | 7/2018 | Karame | G06Q 20/02 |

OTHER PUBLICATIONS

Herbert, Jeff et al., A Novel Method for Decentralised Peer-to-Peer Software License Validation Using Cryptocurrency Blockchain Technology, Proceedings of the 38th Australasian Computer Science Conference (ACSC 2015), pp. 27-35 (Jan. 27-30, 2015).

* cited by examiner

USER CONTROLLED, DECENTRALIZED, DISTRIBUTED, AND SECURE CONTENT DISTRIBUTION

TECHNICAL FIELD OF THE INVENTION

The present invention relates generally to the field of human-centered computing. The present invention relates specifically to the fields of social networking sites, collaborative and social computing devices, collaborative and social computing devices, security and privacy, cryptography, and database and storage security

BACKGROUND OF THE INVENTION

The world is increasingly becoming driven by data. This is not just limited to Internet of Things (IoT), ubiquitous mobile computing, smart energy grids and cities, but more so in social media. Users and corporations are now connected, interacting and sharing data among themselves at an increasing pace. The infrastructure of such services has been traditionally supported by centralized networks. However, lack of trust, transparency and control over organizations that furnish such networks has brought to light the adverse aspects of centralization.

Disruptive technologies has led the computing space towards a decentralized, autonomous, and distributed paradigm. Users are also becoming conscious of their online presence and expect to have more control, traceability, accountability and ownership of their data.

There is a need for a technology that enables users to create a secure, permanent and unbreakable link with their data when sharing it within a circle of users, such as between friends or family members. There is also a need to be able to control the number of further shares or transactions to other users outside the circle of the original content creator. There is also a need for a technology that allow ownership of data to be verified, tracked, and controlled in a social network, and that secures the content of the data from any central authority, third parties or individuals who do not have rights to view the content.

Blockchains can be defined as a chronological database of transactions grouped in a block and validated by a network of computers, with multiple blocks added one after another in a chain. One iteration of the technology is employed in the crypto-currency Bitcoin. Other applications has also emerged taking advantage of the decentralization, traceability, accountability and security of the technology.

Blockchains can be divided into two types, permissioned and permissionless. The main differentiator for the type of blockchain is based on the authorization requirements for nodes in a network to act as validators and have access to the blockchain data. Permissionless blockchains are public and allow anonymous users to participate and contribute their computational power. Permissioned blockchains are restricted and users participate after verification from a centralized third party. This kind of blockchains is usually private.

Transactions that are broadcasted or added to a blockchain are grouped into blocks. These blocks are validated by a competing network of peer nodes. The node that first validates a block of transactions is rewarded in some form. The mechanisms used for validating blocks can be described as proof-of-work, proof-of-stake, or through a consensus- or Paxos-based solution. Any blockchain can use these mechanisms to validate its blocks.

The early blockchains were built around the concept of proof-of-work. The amount of work performed is measured in terms of computational contributions, also called as mining. All nodes in the network compete to mine for a new block by solving for some partial collision using hash functions. The miner that computes it first is rewarded. However, this form of validation could be extremely inefficient in term of energy and, therefore, also very expensive as the work done by miners that do not get validated first are wasted. This incentivizes nodes to centralize the hashing power into pools, which obviously is not desirable for a network whose goal is to minimize the need to trust third parties.

Proof-of-stake validates blocks by randomly choosing nodes to contribute their block to the chain. This form of validation chooses a node based on their stake or reputation, randomness, or through distributed voting.

Consensus- or Paxos-based solutions are designed to solved problems in unreliable distributed systems where multiple isolated computing processing needs to agree. Such algorithms are well suited to address transaction validation requirements of blockchains. This approach has advantage to both proof-of-work and proof-of-stake based approaches as the participating nodes are provided equal weightage and they do not have to pool in their computational power or have a greater stake. Transactions are accepted to the blockchain based on the majority votes of the participating nodes.

The nodes in a blockchain network are incentivized to contribute their computing power. Each time a node verifies a block and it is accepted into the blockchain, they get some form of reward. In the crypto-currency world, they are rewarded in those currencies either by materializing a coin, providing a percentage of the transaction, or allocating the unspent transactions. This facilitates the activeness and decentralization of the blockchain network.

Smart Contracts consists of a program code, a storage file and an account value. It allows any user to create a contract by broadcasting a transaction. Once a contract gets created it cannot be altered.

Blockchains are designed to operate without the need of a central authority. They depend on the consensus of peers in the network who validate the transactions and their lineage. It becomes particularly suitable for authentication of ownership rights as all history of transactions are validated, accepted and added to the blockchain by the whole network allowing ownership to be forever validated and traced.

Data confidentiality, availability and integrity are other key features of blockchains. Permissioned blockchains protect unauthorized disclosures as the blockchain remains private among the participating nodes and transactions are accountable. Blockchains are peer-to-peer systems with each participating node possessing the complete blockchain or parts of it. Availability of data in such a decentralized system remains high, even with a catastrophic failure, as there would always be some nodes possessing the blockchain. Data integrity ensures that data accepted or available in the blockchain is protected from invalid modification, insertion or deletion. Mechanisms, such as proof of work, proof of stake, and consensus- or Paxos-based solutions, are key features in ensuring that the data integrity is maintained. Blockchains inherently preserve data integrity as any malicious activity on the blockchain needs control of more than half of the network's computing power.

SUMMARY

It is an object of the proposed technology to meet the above described needs. It is also an object to provide a user with an improved control of the distribution of a data item over the internet or in a network, such as a social network, and in particular to allow the user to trace the distribution and claim ownership of the data item.

In a first aspect of the proposed technology, the objects are achieved by a method for controlling the distribution of a data item using a data set, or hash table, and a blockchain. The data set is stored at a data storage and the data set comprises a first encrypted data item and a first file identifier paired with the first encrypted data item. The first encrypted data item has been generated by an encryption of the data item by a first user terminal using a first public key. The blockchain comprises the first file identifier and a first recipient identifier identifying one or more, or a plurality of, allowed first recipients with access to the data storage and the blockchain. Each allowed first recipients has the first recipient identifier and a first private key matching the first public key, wherein the first file identifier is paired with the first recipient identifier in the blockchain. The method is performed by a second user terminal being an allowed first recipient of the one or more, or the plurality of, allowed first recipients. The method comprises: identifying the first file identifier in the blockchain using the first recipient identifier, and sending a request containing the first file identifier to the data storage for a downloading of the first encrypted data item. The method further comprises: receiving the first encrypted data item from the data storage, and decrypting the first encrypted data item using the first private key.

The second user terminal may further have a second public key, and the method may further comprise: generating a second encrypted data item by an encryption of the decrypted first encrypted data item using the second public key, and generating a second file identifier. The method then also comprises: sending the second encrypted data item and the second file identifier to the data storage for an updating of the data set with the second encrypted data item paired with the second file identifier. Further, the method then also comprises: adding the second file identifier and a second recipient identifier to the blockchain, wherein the second recipient identifier identifies or is associated with one or more, or a plurality of, allowed second recipients with access to the data storage and the blockchain, and each allowed second recipient has the second recipient identifier and a second private key matching the second public key.

In a second aspect of the proposed technology, the objects are achieved by a method for controlling the distribution of a data item using a data set, or hash table, and a blockchain. The data set is stored at a data storage, and the data set comprises a first encrypted data item and a first file identifier paired with the first encrypted data item. The first encrypted data item has been generated by an encryption of the data item by a first user terminal using a first public key. The blockchain comprises the first file identifier and a first recipient identifier identifying one or more, or a plurality of, allowed first recipients with access to the data storage and the blockchain. Each allowed first recipients has the first recipient identifier and a first private key matching the first public key, wherein the first file identifier is paired with the first recipient identifier in the blockchain. The method is performed by the data storage and comprises: receiving a request for a downloading of the first encrypted data item from a second user terminal being an allowed first recipient of the one or more, or the plurality of, allowed first recipients, wherein the request contains the first file identifier. The method further comprises: identifying the first encrypted data item in the data set using the first file identifier, and sending the first encrypted data item to the second user terminal.

The second user terminal may have a second public key, and the method may further comprise: receiving a second encrypted data item and a second file identifier from the second user terminal, wherein the second encrypted data item has been generated by a decryption of the first encrypted data item using the first private key and by a subsequent encryption of the decrypted first encrypted data item using the second public key. The method may then further comprise: updating the data set with the second encrypted data item paired with the second file identifier.

A data item is understood to encompass digital files, for example a digital image or a digital video. A data set is understood to encompass an ordered collection of digital data. A data storage is understood to encompass a server, a plurality of cooperating servers, and a cloud storage that is accessible via the internet. A user terminal is understood to encompass a terminal that can be operated by a user and access the internet, such as a desktop computer, a laptop computer, a tablet computer and a smartphone. A public key matching a private key is understood to encompass the The allowed first recipients have access to the data storage, and each allowed first recipients may further have access to the data set. This allows for large data items, such as digital images and digital video, to be easily distributed to many recipients.

The above described methods allows for a user to have control over the distribution of the data item, without impeding the accessibility of the intended recipients. The encryption ensures that the distributed data item is viewable only by the intended recipients. The methods also allows for an anonymous and secure distribution, since the data item is encrypted off-sight before storing in the data set and before updating the blockchain. The blockchain enables a decentralized, secure, anonymous and traceable distribution of the data item over the internet or in a network.

In a third aspect of the proposed technology, the objects are achieved by a second user terminal comprising a processor and a non-volatile memory storing program instructions that, when executed by the processor, causes the second user terminal to perform the method according to the first aspect. In a fourth aspect of the proposed technology, the objects are achieved by a second user terminal configured for performing the method according to the first aspect. The third and fourth aspects may comprise any of the steps or features described in relation to the first aspect.

In a fifth aspect of the proposed technology, the objects are achieved by a data storage comprising a processor and a non-volatile memory storing program instructions that, when executed by the processor, causes the data storage to perform the method according to the second aspect. In a sixth aspect of the proposed technology, the objects are achieved by a data storage configured for performing the method according to the second aspect. The fifth and sixth aspects may comprise any of the steps or features described in relation to the first aspect.

DETAILED DESCRIPTION

Further optional features of the method according to the first aspect are described here.

The step of identifying the first file identifier in the blockchain may comprise: traversing the blockchain for identifying the first file identifier and/or for determining that the first encrypted data item can be downloaded or is accessible for download.

The step of sending the second encrypted data item and the second file identifier to the data storage may further comprise: sending the first file identifier to the data storage for an updating of the data set with the first file identifier paired with the second file identifier.

The first file identifier and the first recipient identifier in the blockchain may correspond to, or represent, a first transaction, and the blockchain may comprise a transaction indicator indicating the number of allowed further transactions. The method may then further comprise: updating the transaction indicator to indicate one less number of allowed further transactions. The transaction indicator may be a token value and updating the transaction indication may comprise: reducing the token value by one. This allows for the original user that first uploaded the data item to have a control over the number of subsequent transactions relating to the data item.

Further optional features of the method according to the second aspect are described here.

The method may further comprise: traversing the blockchain for validating the request for the downloading of the first encrypted data item. Additionally or alternatively, the method may comprise: validating the request for identifying the first file identifier, e.g. by using the first file identifier.

Receiving a second encrypted data item and a second file identifier from the first user terminal may comprise: receiving the first file identifier from the second user terminal, and updating the data set may further comprise: identifying the data set using the first file identifier and/or updating the data set with the first file identifier paired with the second file identifier. This has the effect that the distribution of the transaction history of the data item can be traced in the data set.

The method further may comprise: traversing the blockchain for validating that the blockchain has been updated with the second file identifier and a second recipient identifier, wherein the second recipient identifier identifies or is associated with one or more, or a plurality of, allowed second recipients with access to the data storage and the blockchain, and each allowed second recipient has the second recipient identifier and a second private key matching the second public key. This ensures a match between the data set and the blockchain. The method may further comprise: traversing the blockchain for identifying the second file identifier. This ensures that the blockchain has been updated properly.

The first file identifier and the first recipient identifier in the blockchain may correspond to, or represent, a first transaction, and the blockchain may comprise a transaction indicator indicating the number of allowed further transactions. The method may then comprise: validating the blockchain for determining the number of allowed further transactions. If it is determined that no further transactions are allowed, the method may further comprise: preventing any further transactions involving an encrypted data item based on the data item. The transaction indicator may be a token value and preventing any further transactions is performed if the token value is zero. This allows for the original user that first uploaded the data item to have a control over the number of subsequent transactions relating to the data item.

Further optional features of the method according to the first and second aspects are described here.

The first file identifier may be, or comprise, a first hashtag, or first hash key, generated from the first encrypted data item. The first recipient identifier may be, or comprise, the first public key. Similarly, the second file identifier may be, or comprise, a second hashtag, or second hash key, generated from the second encrypted data item. The second recipient identifier may be, or comprises, the second public key.

Each allowed first recipients may be a user terminal. Similarly, each allowed second recipient may be a user terminal.

The data set may be, or comprise, a table comprising a first column, a second column, a third column, and a plurality of rows. Each row may have a sender file identifier for a sender encrypted data item generated by a sender terminal and sent to a receiver terminal from the data storage in the first column, a receiver file identifier for a receiver encrypted data item generated by the receiver terminal and sent to the data storage in the second column, and a receiver encrypted data item generated by a decryption and a subsequent encryption of the sender encrypted data item in the third column. This has the effect that each row represents an allowed transaction and that the transaction history can be construed from the data set. The table may further comprise a row having an upload file identifier for an upload encrypted data item generated by an upload terminal and sent to the data storage in the first column and in the second column, and the upload encrypted data item generated by an encryption of the data item in the third column. This allows for a secure upload of the original data item to the data storage. The first file identifier may be a sender file identifier, the second file identifier may be a receiver file identifier, and the second encrypted data item may be a receiver encrypted data item.

The second public key may be the same as or different from the first public key.

BRIEF DESCRIPTION OF THE DRAWINGS

A more complete understanding of the abovementioned and other features and advantages of the present invention will be apparent from the following detailed description of the drawings, wherein.

DETAILED DESCRIPTION OF THE DRAWINGS

Figure 1:
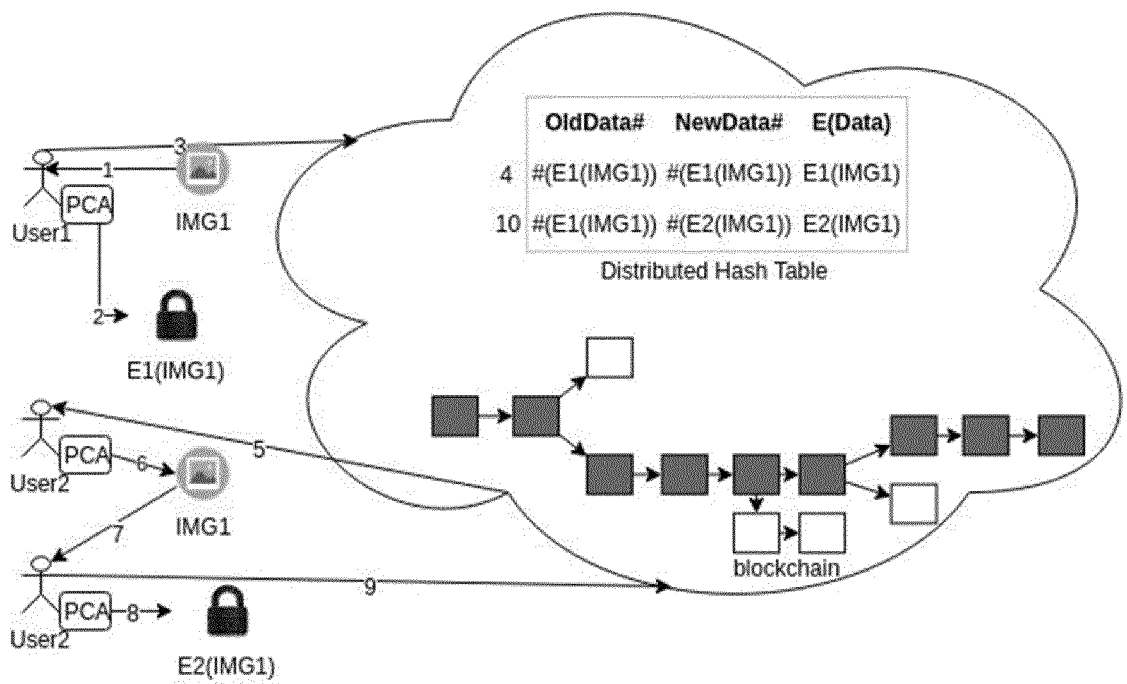
FIG. 1 schematically illustrates the workflow for generating a data set, or hash table in an application of a generalized embodiment, FIG. 2 schematically illustrates state transitions of a blockchain in an application of the generalized embodiment described in relation to FIG. 1.

A generalized embodiment is described below. It provides a solution for creating a user centric social network that enables users to control, trace and securely share content. This embodiment has four core components. The first component is a blockchain that keeps record of ownership of data items and number of shares made. The blockchain describes assets as data, or encrypted data items, shared in transactions or broadcasted in a network. Unlike regular state transition systems that describe ownership status of assets, the blockchain defines a state as a depletion of a token value that determines the number of transactions or shares that can be performed with that asset.

The second component is a relationship system that forms part of the blockchain and enables program code to be executed on the blockchain and control the number of allowed shares, or transactions, for a data item. The relationship system handles the transition of the states through validation of the tokens until they get completely depleted.

The third component is a hash table, or data set, that stores encrypted data shared by user shares. The hash table is stored in a server, or data store.

The fourth component is a local Personal Certificate Authority (PCA) that manages a user's circles or relationships, encryption keys and controls access to content, or encrypted data items. The PCA is a program code installed and executed on a terminal operated by a user. Users in a circle all share a public encryption key and all have a private encryption key matching the public key. The PCA ensure that the encrypted assets, or encrypted data items, that have been shared, or received in a transaction, are viewable by only the intended circle of members, or users.

A transaction is made between a user and the members, or users, belonging to the user's circle of members, or users. The PCA creates an encrypted version of the data with the circle's public key and stores it in the distributed hash table. Multiple users may encrypt the data to share among their own circles of members, or users.

The hash table contains three columns. The first being the hash, or hashtag, of the encrypted data item shared with them, the second being the hash, or hashtag, of the data item decrypted and re-encrypted using their circle's public key for further shares, or transactions, and the third column stores this encrypted data item. The genesis transaction of the data item has the same hash, or hashtag, for the first two columns. The user shares the hash id, or hashtag, of the data they encrypted with each member of their circle. This enables maintainability of precise traceability and control over shareability. Transactions are broadcasted to the blockchain with the user identity, or public key, and the data hash id, or hashtag of the encrypted data item, to record the trails, or transactions. It also contains a token value set by the data owner that species the allowed number of additional shares, or transactions. Whenever a transaction is broadcasted, the Relationship System is invoked and it verifies that the share is allowed by checking the token value. It decrements the token value for any further shares by a member, or user, of the user's circle. Transactions with the data item are disallowed when the token value becomes zero.

The hash table, or data set, acts as a distributed data store. Blockchains are inherently decentralized, but not distributed. Data items that a user shares can be of type image or video. These are typically files of large sizes and need to be stored in a distributed manner for efficient storage, indexing and traversals. The blockchain itself would contain the transactions in terms of user shares, referring to the shared hash id, or hashtag, of a file, or encrypted data item. The lineage of a file, or data item is recorded in the hash table, or data set, with an old hash ids, or old hashtags, and new hash ids, or new hashtags. An old hash, or old hashtag, refers to the file encrypted by the user who shares it and a new hash, or new hashtag, represents the file decrypted and re-encrypted by the user with whom the file was shared.

FIG. 1, illustrates the workflow for creating the hash table, or data set, in an application of the generalized embodiment. Actions described here as performed by a user is understood be executed by a terminal operated by a user. A user, User1, gets 1, or obtains, an image IMG1, i.e. a data item, and encrypts it 2 with the public key of the circle, or circle of users, with whom it will be shared using the PCA. The user then stores 3 the encrypted image, or data item, into the hash table, or data set, with the hash, or hashtag, of his encrypted image as OldData # and NewData #4. Since the user is the owner of the image, both the old and new hash keys, or hashtags, are the same.

Another user, User2, is a member of the circle, or circle of users, who has access to, or is intended recipients of, the shared image. After traversing the blockchain, the user access 5, or receives, the image from the hash table and decrypts 6 it. This user now re-shares 7 this image with its circle, or circle of users, by encrypting it 8 with the public key of the circle. This encrypted image gets stored 9 in the hash table, or data set, with the hash key, or hashtag, of the previous encryption as OldData # and its new hash, or hashtag, as NewData #10.

Maintaining a separate hash table, or data set, for storing the data outside the blockchain allows a predictable growth of the blockchain. Since validation of blocks usually needs downloading of the complete chain by the participating nodes, larger blockchains would result in considerable computing constrains.

In the blockchain, a user wishing to share a data item with its circle, or circle of users, creates the first broadcast as a transaction with its identity, or public key, as from address and the hash key, or hashtag, of the encrypted data item as to address. The transaction also contains a token value that specifies the number of allowed shares, or transactions, with that data item. Next, the user broadcasts multiple transactions, each containing the hash key, or hashtag, of the encrypted data item, as from address and identity, or public key, of the members of the circle, or circle of users, as to address. The value of the token is also present in the transaction. Any shares made with this data item make, or define, another transaction with the new user's identity, or public key, as from address and the hash key, or hashtag, of the data, data item encrypted with the public key of this new user's circle, or circle of users, as to address. Following this, multiple transactions are again made for members of that user's circle, or circle of users, with the new hash key, or hashtag, as from address and the identity, or public key, of members of the user's circle as to address.

Figure 2:
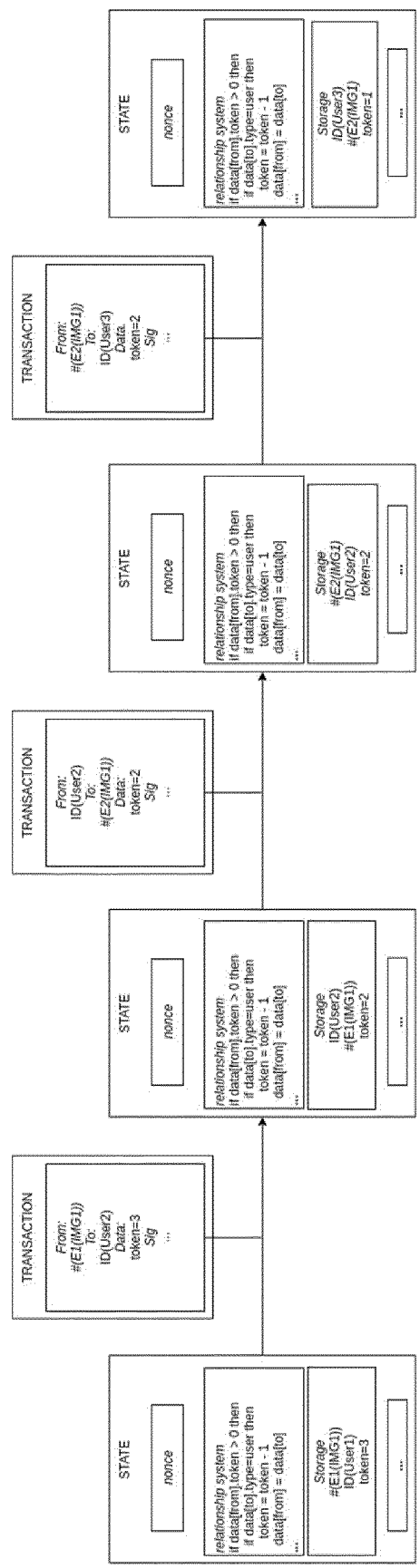

FIG. 2 schematically illustrates state transitions of a blockchain in an application of the above described generalized embodiment. A transaction contains a from address, a to address, the data value, or token value, and a digital signature. A state contains a cryptographic nonce which is an arbitrary number that may only be used once. An executable code using the relationship system verifies whether a transaction is valid in terms of the allowed number of shares, or transactions. If the transaction is allowed, it decrements the token value by one. A data storage is also present, containing the trails of the shares and its token value. The generalized embodiment can share technical aspects with established blockchains for validation of blocks, proof-of-work, proof-of-stake, consensus- or Paxos-based solutions, maintenance of the decentralized database, incentives for mining and other procedures.

The relationship system of the generalized embodiment is a Turing complete programmable unit. It features loops, internal states and can even make transactions with other actors. The computation would be executed on every participating node in the network. The purpose of the relationship system is to verify that shared transactions are valid. Prior to creating a state, it verifies the token value and decrements it. Whenever a token value reaches zero, it reverts to the previous state and does not allow any future shares, or transactions, of that data item.

The PCA is a client software that manages a user's circles, or circles of users, securely shares the private keys of the circles, or circles of users, with its members, keeps records of keys shared with it and encrypts any data shared with a circle with its public key. The PCA ensures that any data stored in the hash table, or data set, is encrypted before it is broadcasted. It also maintains a revocation list that revokes rights of a member of a user's circle, or circle of users.

In one exemplary embodiment of the generalized embodiment, the key management of the PCA is built upon the existing Bitcoin Wallet solution.

The technology of the generalized embodiment allows for a permissioned blockchain, since it requires a user to be validated. It also allows for consensus- or Paxos-based validation scheme, since it allows for better utilization of resources and would suit in a permissioned setting. An incentive scheme for a user could be access to a social network and the ability to share data in a secure, anonymized and decentralized manner. Its relationship system can also draw upon the contributions from smart contracts.

Figure 3:
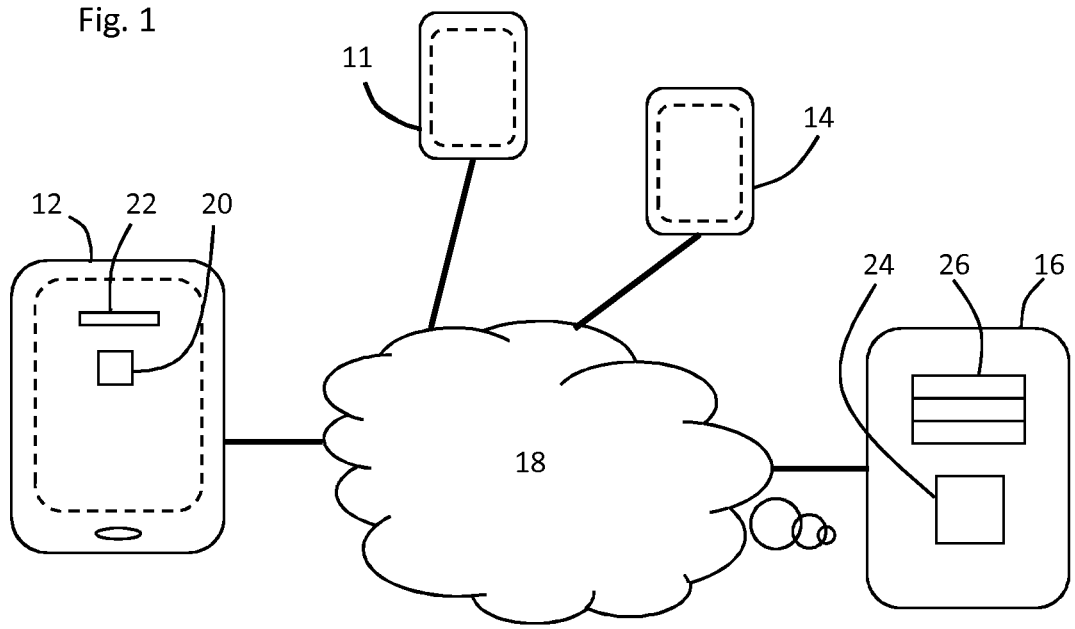
FIG. 3 illustrates a setup that implements an embodiment of the invention.

A setup that implements embodiments of the invention is illustrated in FIG. 3. A first user terminal 11, a second user terminal 12, a third user terminal 14, and a data storage 16 are connected to and can communicate via the internet 18 and have access to a blockchain. For example, user terminals 11-14 can be smartphones and the data storage can be a server.

The second user terminal 12 has a processor 20 an a nonvolatile memory 22 that contains program instructions that, when executed by the processor 20, causes the second user terminal 12 to perform the method described below in relation to FIG. 4. Similarly, the data storage 16 has a processor 24 an a nonvolatile memory 26 that contains program instructions that, when executed by the processor 24, causes the data storage 16 to perform the method described below in relation to FIG. 4

A data set is stored in the non-volatile memory of the data storage 16. The data set includes a first encrypted data item and a first file identifier paired with the first encrypted data item. The first encrypted data item has been generated by an encryption of a data item by the first user terminal 11 using a first public key. In one embodiment, the first file identifier is a first hashtag generated from the first encrypted data item.

The blockchain includes the first file identifier paired with a first recipient identifier identifying one or more allowed first recipients with access to the data storage 16 and the blockchain. Each of the allowed first recipients has the first recipient identifier and a first private key matching the first public key. The second user terminal 12 is an allowed first recipient. In one embodiment, first recipient identifier is the first public key, and/or each allowed first recipient is a user terminal.

Figure 4:
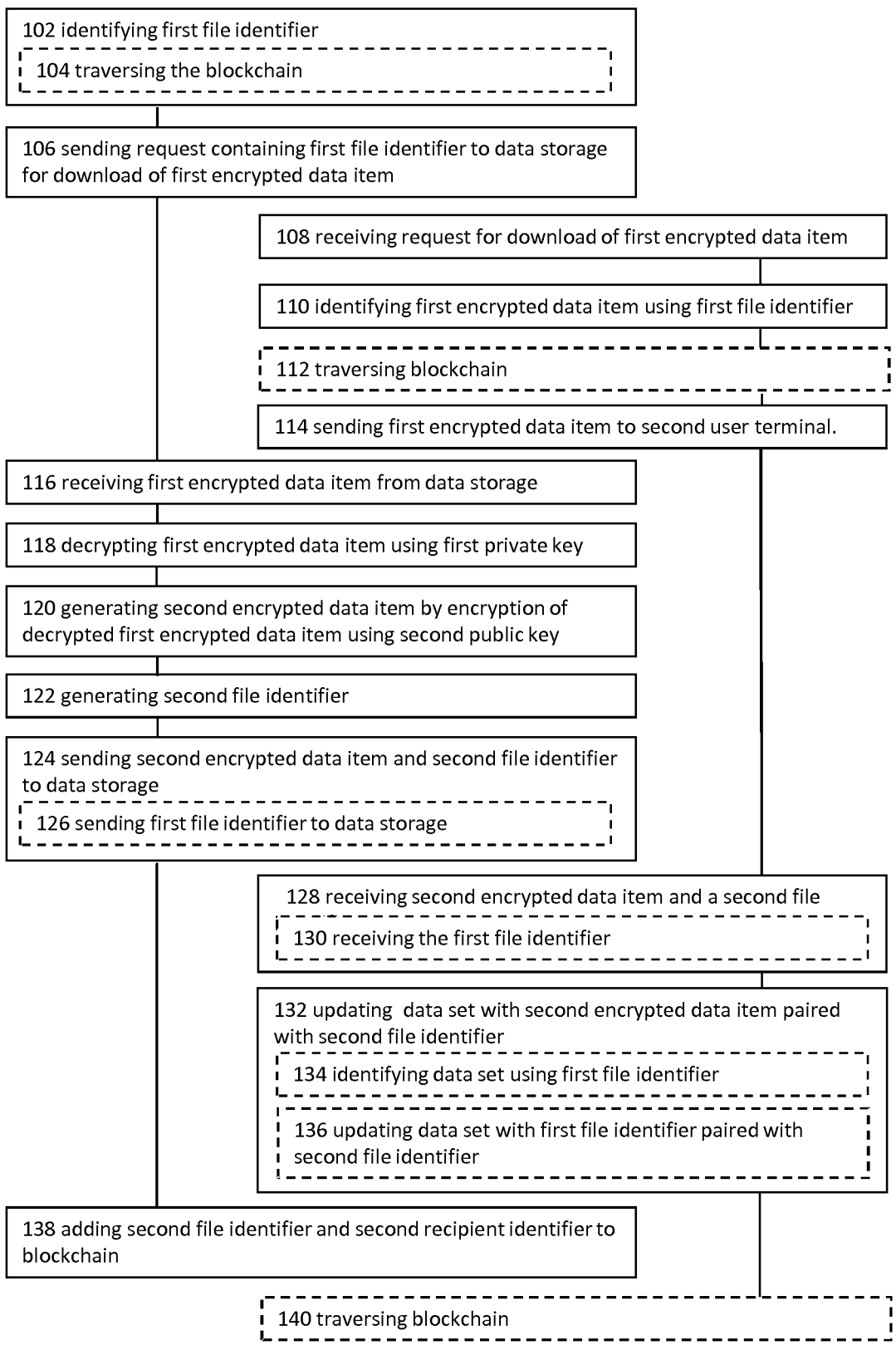
FIG. 4 illustrates a flow chart representing an embodiment performed by a second user and a data storage.

In FIG. 4, the left flow chart illustrates the method performed by the second user 12 and the right flowchart is illustrates the method performed by the data storage 16. Optional steps are indicated by dashed borders.

The second terminal 12 first identifies 102 the first file identifier in the blockchain using the first recipient identifier, i.e. the first public key. In one embodiment, the second user terminal determining that the first encrypted data item can be downloaded by traversing the blockchain 104. The second user terminal then sends a request 106 containing the first file identifier to the data storage 16 for a downloading of the first encrypted data item.

The data storage 16 then receives 108 the request contains the first file identifier for a downloading of the first encrypted data item from the second user 12 terminal. It then identifies 110 first encrypted data item in the data set using the first file identifier, and sends 114 the first encrypted data item to the second user 12 terminal. In one embodiment, the data storage 16 first traverses 112 the blockchain for validating the request for the downloading of the first encrypted data item.

The second user terminal 12 receives 116 the first encrypted data item from the data storage 16 and decrypts 118 the first encrypted data item using the first private key.

The above steps enables a control of the distribution of a data item, in particular for the first user terminal and the user terminal that first shared the data item and initialized the blockchain and the data set. In further embodiments, the methods performed by the second user terminal 12 and the data storage 16 includes the steps described below.

The second user terminal 12 has a second public key and generates 120 a second encrypted data item by an encryption of the decrypted first encrypted data item using the second public key. It then generates 122 a second file identifier. In one embodiment, the second file identifier is a second hashtag generated from the second encrypted data item. The second encrypted data item and the second file identifier is sent 124 to the data storage for an updating of the data set.

The data storage 16 receives 128 the second encrypted data item and a second file identifier from the second user terminal 12 and updates 132 the data set with the second encrypted data item paired with the second file identifier. In one embodiment, the second user terminal 12 also sends 126 the first file identifier to the data storage 16 for an updating of the data set. The data storage 16 then receives 130 the first file identifier from the second user terminal 12, and updates 136 the data set with the first file identifier paired with the second file identifier. In one embodiment it also identifies the data set using the first file identifier.

The second user terminal 12 adds the second file identifier and a second recipient identifier to the blockchain. The second recipient identifier identifies, or is associated with one or more allowed second recipients with access to the data storage and the blockchain. Each allowed second recipient has the second recipient identifier and a second private key matching the second public key. The third user terminal 14 in the setup described in relation to FIG. 3 is an allowed second recipient. In one embodiment, the second recipient identifier is the second public key, and/or each allowed second recipient is a user terminal. In one alternative embodiment, the data storage further traverses the blockchain for validating that the blockchain has been updated with the second file identifier and the second recipient identifier, and/or for identifying the second file identifier.

The first file identifier and the first recipient identifier in the blockchain correspond to a first transaction. In one embodiment the blockchain has a transaction indicator indicating the number of allowed further transactions. The second user terminal 12 then updates the transaction indicator to indicate one less number of allowed further transactions. In one embodiment the transaction indicator is a token value and the token value is reduced by one. In one embodiment, the data storage 16 further validates the blockchain for determining the number of allowed further transactions. If it is determined by the data storage 16 that no further transactions are allowed it prevents any further transactions involving an encrypted data item based on the data item. In the embodiment where the transaction indicator is a token value, the data storage prevents any further transactions to be performed if the token value is zero

The invention claimed is:

1. A method for controlling the distribution of a data item using a data set and a blockchain,
   wherein the data set is stored at a data storage,
   wherein the data set comprises a first encrypted data item and a first file identifier paired with the first encrypted data item, and the first encrypted data item has been generated by an encryption of the data item by a first user terminal using a first public key,
   wherein the blockchain comprises the first file identifier and a first recipient identifier identifying one or more, or a plurality of, allowed first recipients with access to the data storage and the blockchain, and each allowed first recipients has the first recipient identifier and a first private key matching the first public key, wherein the first file identifier is paired with the first recipient identifier in the blockchain
   wherein the method is performed by a second user terminal being an allowed first recipient of the one or more, or the plurality of, allowed first recipients, and the second user terminal has a second public key, and the method comprises:
      identifying the first file identifier in the blockchain using the first recipient identifier,
      sending a request containing the first file identifier to the data storage for a downloading of the first encrypted data item,
      receiving the first encrypted data item from the data storage,
      decrypting the first encrypted data item using the first private key,
      generating a second encrypted data item by an encryption of the decrypted first encrypted data item using the second public key,
      generating a second file identifier,
      sending the second encrypted data item and the second file identifier to the data storage for an updating of the data set with the second encrypted data item paired with the second file identifier, and
      adding the second file identifier and a second recipient identifier to the blockchain, wherein the second recipient identifier identifies, or is associated with, one or more, or a plurality of, allowed second recipients with access to the data storage and the blockchain, and each allowed second recipient has the second recipient identifier and a second private key matching the second public key.

2. The method according to claim 1, wherein the first file identifier is or comprises a first hashtag, or first hash key, generated from the first encrypted data item.

3. The method according to claim 1, wherein the first recipient identifier is or comprises the first public key.

4. A method for controlling the distribution of a data item using a data set and a blockchain,
   wherein the data set is stored at a data storage,
   wherein the data set comprises a first encrypted data item and a first file identifier paired with the first encrypted data item, and the first encrypted data item has been generated by an encryption of the data item by a first user terminal using a first public key,
   wherein the blockchain comprises the first file identifier and a first recipient identifier identifying one or more, or a plurality of, allowed first recipients with access to the data storage and the blockchain, and each allowed first recipients has the first recipient identifier and a first private key matching the first public key, wherein the first file identifier is paired with the first recipient identifier in the blockchain
   wherein the method is performed by a second user terminal being an allowed first recipient of the one or more, or the plurality of, allowed first recipients, and the method comprises:
      identifying the first file identifier in the blockchain using the first recipient identifier,
      sending a request containing the first file identifier to the data storage for a downloading of the first encrypted data item,
      receiving the first encrypted data item from the data storage, and
      decrypting the first encrypted data item using the first private key,
   wherein identifying the first file identifier in the blockchain comprises:
      validating the request to determine that the first encrypted data item can be downloaded by traversing the blockchain.

5. The method according to claim 1, wherein sending the second encrypted data item and the second file identifier to the data storage further comprises:
   sending the first file identifier to the data storage for an updating of the data set with the first file identifier paired with the second file identifier.

6. The method according to claim 1, wherein the second file identifier is or comprises a second hashtag, or second hash key, generated from the second encrypted data item.

7. The method according to claim 1, wherein the second recipient identifier is or comprises the second public key.

8. The method according to claim 1, wherein the first file identifier and the first recipient identifier in the blockchain corresponds to a first transaction, and the blockchain comprises a transaction indicator indicating the number of allowed further transactions, wherein the method further comprises:
   updating the transaction indicator to indicate one less number of allowed further transactions.

9. The method according to claim 8, wherein the transaction indicator is a token value and updating the transaction indication comprises:
   reducing the token value by one.

10. A method for controlling the distribution of a data item using a data set and a blockchain,
    wherein the data set is stored at a data storage,
    wherein the data set comprises a first encrypted data item and a first file identifier paired with the first encrypted data item, and the first encrypted data item has been generated by an encryption of the data item by a first user terminal using a first public key,
    wherein the blockchain comprises the first file identifier and a first recipient identifier identifying one or more, or a plurality of, allowed first recipients with access to the data storage and the blockchain, and each allowed first recipients has the first recipient identifier and a first private key matching the first public key, wherein the first file identifier is paired with the first recipient identifier in the blockchain,
    wherein the method is performed by the data storage and comprises:
       receiving a request for a downloading of the first encrypted data item from a second user terminal being an allowed first recipient of the one or more, or the plurality of, allowed first recipients, wherein the request contains the first file identifier, validating the request for the downloading of the first encrypted data item and/or for identifying the first file identifier by traversing the blockchain, and sending the first encrypted data item to the second user terminal.

11. The method according to claim 10, wherein the first file identifier is or comprises a first hashtag, or first hash key, generated from the first encrypted data item.

12. The method according to claim 10, wherein the first recipient identifier is or comprises the first public key.

13. The method according to claim 10, wherein the second user terminal has a second public key, and the method further comprises:

receiving a second encrypted data item and a second file identifier from the second user terminal, wherein the second encrypted data item has been generated by a decryption of the first encrypted data item using the first private key and by a subsequent encryption of the decrypted first encrypted data item using the second public key, and updating the data set with the second encrypted data item paired with the second file identifier.

14. The method according to claim 13, wherein receiving a second encrypted data item and a second file identifier from the first user terminal comprises:

receiving the first file identifier from the second user terminal, and updating the data set further comprises:

identifying the data set using the first file identifier and/or updating the data set with the first file identifier paired with the second file identifier.

15. The method according to claim 13, wherein the method further comprises:

traversing the blockchain for validating that the blockchain has been updated with the second file identifier and a second recipient identifier, wherein the second recipient identifier identifies or is associated with one or more, or a plurality of, allowed second recipients with access to the data storage and the blockchain, and each allowed second recipient has the second recipient identifier and a second private key matching the second public key.

16. The method according to claim 13, wherein the first file identifier and the first recipient identifier in the blockchain corresponds to a first transaction, and the blockchain comprises a transaction indicator indicating the number of allowed further transactions, wherein the method further comprises:

validating the blockchain for determining the number of allowed further transactions.

17. The method according to claim 16, wherein if it is determined that no further transactions are allowed, the method comprises:

preventing any further transactions involving an encrypted data item based on the data item.

18. The method according to claim 17, wherein the transaction indicator is a token value and preventing any further transactions is performed if the token value is zero.

* * * * *